United States Patent
Navon et al.

(10) Patent No.: US 12,229,016 B2
(45) Date of Patent: Feb. 18, 2025

(54) STORAGE DEVICE FOR STORING MODEL CHECKPOINTS OF RECOMMENDATION DEEP-LEARNING MODELS

(71) Applicant: Western Digital Technologies, Inc., San Jose, CA (US)

(72) Inventors: Ariel Navon, Revava (IL); Alexander Bazarsky, Holon (IL); Shay Benisty, Beer Sheva (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 127 days.

(21) Appl. No.: 17/970,190

(22) Filed: Oct. 20, 2022

(65) Prior Publication Data

US 2023/0251935 A1 Aug. 10, 2023

Related U.S. Application Data

(63) Continuation-in-part of application No. 17/592,953, filed on Feb. 4, 2022.

(51) Int. Cl.
*G06F 11/14* (2006.01)
*G06N 3/04* (2023.01)

(52) U.S. Cl.
CPC ...... *G06F 11/1456* (2013.01); *G06F 11/1451* (2013.01); *G06N 3/04* (2013.01)

(58) Field of Classification Search
None
See application file for complete search history.

(56) References Cited

U.S. PATENT DOCUMENTS 11,133,059 B2  9/2021  Rom et al.
11,216,696 B2  1/2022  Navon et al.
(Continued)

OTHER PUBLICATIONS

Wang, Z., et al., "CNN-DMA: A Predictable and Scalable Direct Memory Access Engine for Convolutional Neural Network with Sliding-window", GLSVLSI '21: Proceedings of the 2021 on Great Lake Symposium on VLSI, pp. 115-121, (Jun. 22-25, 2021).

(Continued)

*Primary Examiner* — Brian R Peugh
(74) *Attorney, Agent, or Firm* — PATTERSON + SHERIDAN, LLP

(57) ABSTRACT

The present disclosure generally relates to utilizing improved DL training models stored in non-volatile memory to optimize data transfer and storage. The proposed system would identify workloads of DNN training and occasionally check the difference rate between successive data transfers (representing successive training iterations of the model). Comparing the difference rate to given thresholds could indicate "recommendation-system" typical use case. In such a case the NAND operating system would apply systematic compression of the data by saving only the changed parameters between successive iteration cycles ("batches"). The host may indicate the checkpoint storage configuration of the training model (every iteration, every several iterations etc. . . . ) and other elements. The system may be efficiently utilized combining the NAND based DNN training interface, adding the checkpoint configuration information to the dedicated interface. The current iteration's model is stored in the NAND, so adding the checkpoint related information is most efficient.

20 Claims, 10 Drawing Sheets

(56) References Cited

U.S. PATENT DOCUMENTS

| | | | |
|---|---|---|---|
| 2013/0124794 A1 | 5/2013 | Bux et al. | |
| 2014/0089265 A1* | 3/2014 | Talagala | G06F 16/22 707/674 |
| 2016/0247080 A1 | 8/2016 | Trantham et al. | |
| 2020/0401850 A1 | 12/2020 | Bazarsky et al. | |
| 2021/0048808 A1 | 2/2021 | Bielby et al. | |
| 2021/0142167 A1 | 5/2021 | Lie et al. | |
| 2021/0304009 A1 | 9/2021 | Bazarsky et al. | |

OTHER PUBLICATIONS

Wang, G., "A Logical Neural Network Structure With More Direct Mapping From Logical Relations", arXiv:2106.11463v1, pp. 1-11, (Jun. 22, 2021).

Gang Wang "A Logical Neural Network Structure with More Direct Mapping from Logical Relations" arXiv: 2106.11463v1 [cs.NE] pp. 1-11 (Jun. 22, 2021).

Zheng Wang et al. CNN-DMA: "A Predictable and Scalable Direct Memory Access Engine for Convolutional Neural Network with Sliding-window". GLSVLSI '21 pp. 115-121, Sections 3.2-3.3, 4.1-4.2; and figure 5. (Jun. 22, 2021).

International Search Report and Written Opinion for International Application No. PCT/US2022/030419 dated Oct. 21, 2022.

Liang, et al, InS-DLA: An In-SSD Deep Learning Accelerator for Near-Data Processing, 2019, In 2019 29th International Conference on Field Programmable Logic and Applications (FPL), Sep. 8, pp. 173-179, IEEE.

Srivastava, et al, Dropout: A Simple Way to Prevent Neural Networks from Overfitting, Journal of Machine Learning Research 15 (2014) 1929-1958.

* cited by examiner

STORAGE DEVICE FOR STORING MODEL CHECKPOINTS OF RECOMMENDATION DEEP-LEARNING MODELS

CROSS-REFERENCE TO RELATED APPLICATIONS

This application is a continuation in part of U.S. patent application Ser. No. 17/592,953, filed Feb. 4, 2022, which is herein incorporated by reference in its entirety.

BACKGROUND OF THE DISCLOSURE

Field of the Disclosure

Embodiments of the present disclosure generally relate to utilizing improved deep learning training models stored in non-volatile memory to optimize data transfer and storage.

Description of the Related Art

The concept of NAND-based accelerated Deep-Learning (DL) system with an automatic read/write interface between a computation-unit and a NAND storage server is used in various fields. Utilizing unique characteristics of the DL work mode (vs. standard workloads), in order to allow boosting of the read/write performance and reduce firm ware (FW)/host command overhead from the storage device during training of DL models.

Modern DL models require a very large allocation of fast memory as a "working-sheet" for parameter tuning (during the training procedure of the DL model). Utilizing the unique nature of the DL training procedure which includes (in most flavors) a fully deterministic work plan that is defined by the known Neural-Network (NN) design, and the values of the hyper parameters, for establishing an automatic handshake between the HW computation engines and the NAND and thus allow acceleration of the NN training/inference procedures.

Training procedure of DL models often involves large scale datasets, as well as giant models and very long training time scales (multiple days and even weeks). A very common DL model is known as recommendation system which is a model that seeks to predict the interest rate (or "preference") a user would give to an item. Such models are highly useful in advertising and commercial shopping industries. Researchers from Meta (Facebook) report at a recent paper that "at Meta's datacenter fleet, for example, deep recommendation models consume more than 80% of the machine learning inference cycles and more than 50% of the training cycles". It is reported that similar demands can be found at other companies. The Meta paper mentioned above cites that the storage footprint of only the model-snapshots ("checkpoints") of such recommendation systems at-scale "requires hundreds of petabytes of storage capacity, with high availability and short access times".

Recommendation models have a unique property where only a small fraction of the model parameters is updated after each iteration. In traditional deep neural networks (DNNs) the entire model is updated after each iteration since gradients are computed for all the model parameters. Recommendation models, on the other hand, access and update only a small fraction of the model during each iteration. When combined with a NAND based accelerated Deep-Learning system the host reads and writes the model data from/to the NAND device during the training of the model. In order to create checkpoints of the model's state, the model's state would require another "channel" to a storage device or create additional overhead to the existing storage device if the host is to compress and write this data.

Allowing an efficient NAND-based data compression during training of such models is important for automatic snapshots logging. By utilizing the special properties of the mentioned above recommendation system DNN models the NAND-accelerated DL training system proposed can be improved. The improvement is to reduce the storage capacity required for snapshots logging, as well as accelerate the programming/reading bandwidth. The reduction of storage and accelerating the programing/reading bandwidth will improve the position of NAND as viable working sheet for DL systems.

In traditional architectures of storage memories, a standard practice would be to save the (potentially compressed) model between training iterations. Thus, the host writes the model to the storage device, using the interface up for this purpose. Standard memory device systems are not aware of the mentioned above unique property of the highly useful DNN recommendation-systems models, and as such do not apply special compression techniques—dedicated to the recommendation system models.

Therefore, there is a need in the art for optimized data transfer and storage through improved training of DL models.

SUMMARY OF THE DISCLOSURE

The present disclosure generally relates to utilizing improved deep learning training models stored in non-volatile memory to optimize data transfer and storage. The proposed system would identify workloads of DNN training and occasionally check the difference rate between successive data transfers (representing successive training iterations of the model). Comparing the difference rate to given thresholds could indicate "recommendation-system" typical use case. In such a case the NAND operating system would apply systematic compression of the data by saving only the changed parameters between successive iteration cycles ("batches"). The host may indicate the checkpoint storage configuration of the training model (every iteration, every several iterations etc. . . . ) and other elements. The system may be efficiently utilized combining the NAND based DNN training interface, adding the checkpoint configuration information to the dedicated interface. The current iteration's model is stored in the NAND, so adding the checkpoint related information is most efficient.

In one embodiment, a data storage device comprises: a memory device; and a controller coupled to the memory device, wherein the controller is configured to be coupled to a host device, and wherein the controller is further configured to: receive a first command; generate logical block address (LBA) to physical block address (PBA) (L2P) mappings for the first command, wherein the L2P mapping is generated based on a result of deep learning (DL) training model using a neural network (NN) structure; store data of the first command in the memory device; receive a second command; determine a difference between the data of the first command and data of the second command; generate LBA to PBA L2P mappings for the difference, wherein the L2P mapping is generated based on a result of DL training module using the NN structure; and store the difference in the memory device.

In another embodiment, a data storage device comprises: a memory device; and a controller coupled to the memory device, wherein the controller comprises: a neural network (NN) command interpretation unit; a logical block address (LBA) to physical block address (PBA) (L2P) mapping generator coupled to the NN command interpretation unit, wherein the controller is configured to fetch training data and NN parameters from the memory device; and a compression engine coupled to both the NN command interpretation unit and the L2P mapping generator.

In another embodiment, a data storage device comprising: non-volatile memory means; and a controller coupled to the non-volatile memory means, wherein the controller is configured to: store neural network (NN) parameters in the non-volatile memory means; performing a deep learning (DL) training model; store data according to the DL training model; and perform compression based upon a difference between past iterations of performing the DL training model.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to utilizing improved deep learning training models stored in non-volatile memory to optimize data transfer and storage. The proposed system would identify workloads of DNN training and occasionally check the difference rate between successive data transfers (representing successive training iterations of the model). Comparing the difference rate to given thresholds could indicate "recommendation-system" typical use case. In such a case the NAND operating system would apply systematic compression of the data by saving only the changed parameters between successive iteration cycles ("batches"). The host may indicate the checkpoint storage configuration of the training model (every iteration, every several iterations etc. . . . ) and other elements. The system may be efficiently utilized combining the NAND based DNN training interface, adding the checkpoint configuration information to the dedicated interface. The current iteration's model is stored in the NAND, so adding the checkpoint related information is most efficient.

Figure 1:
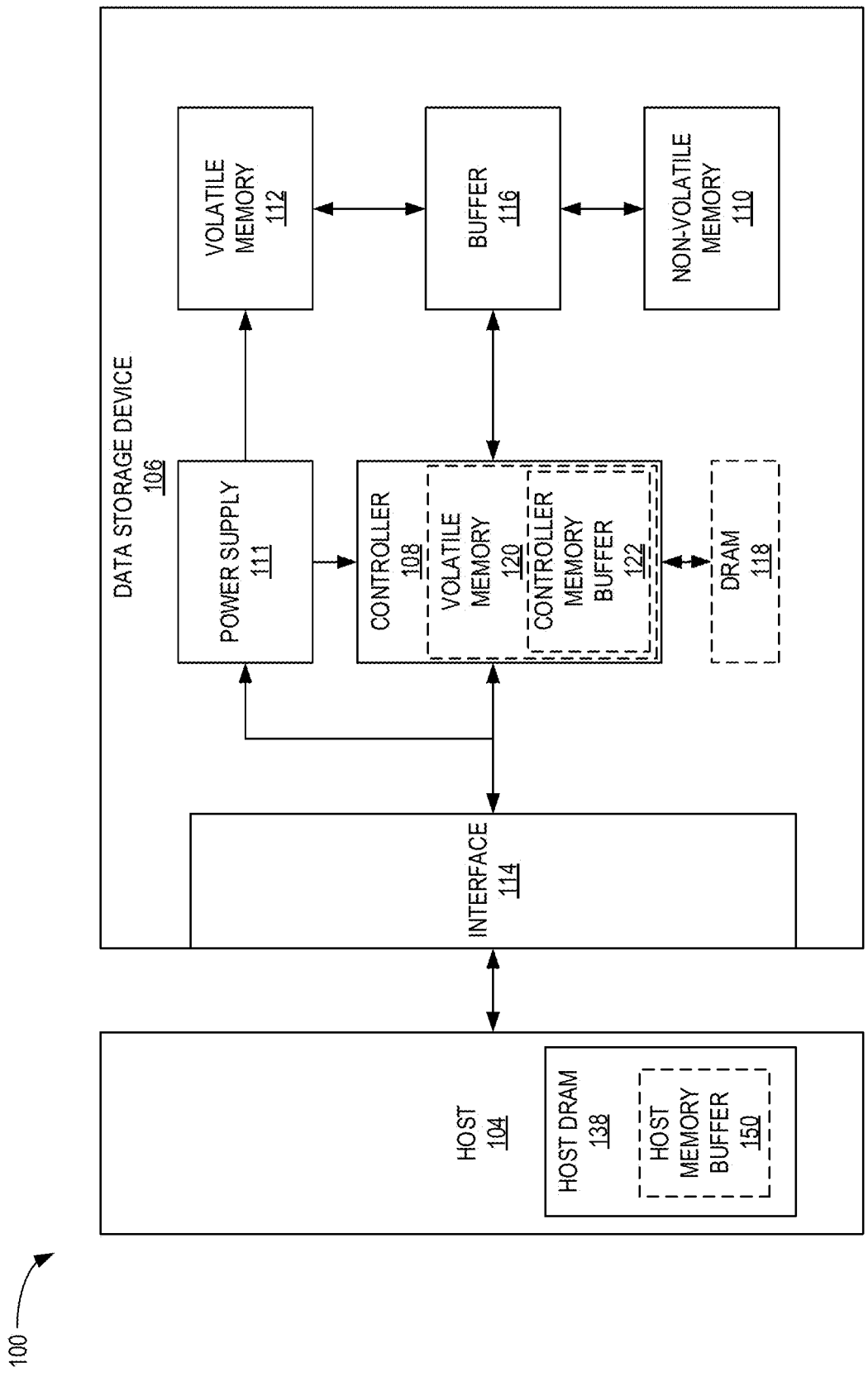
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
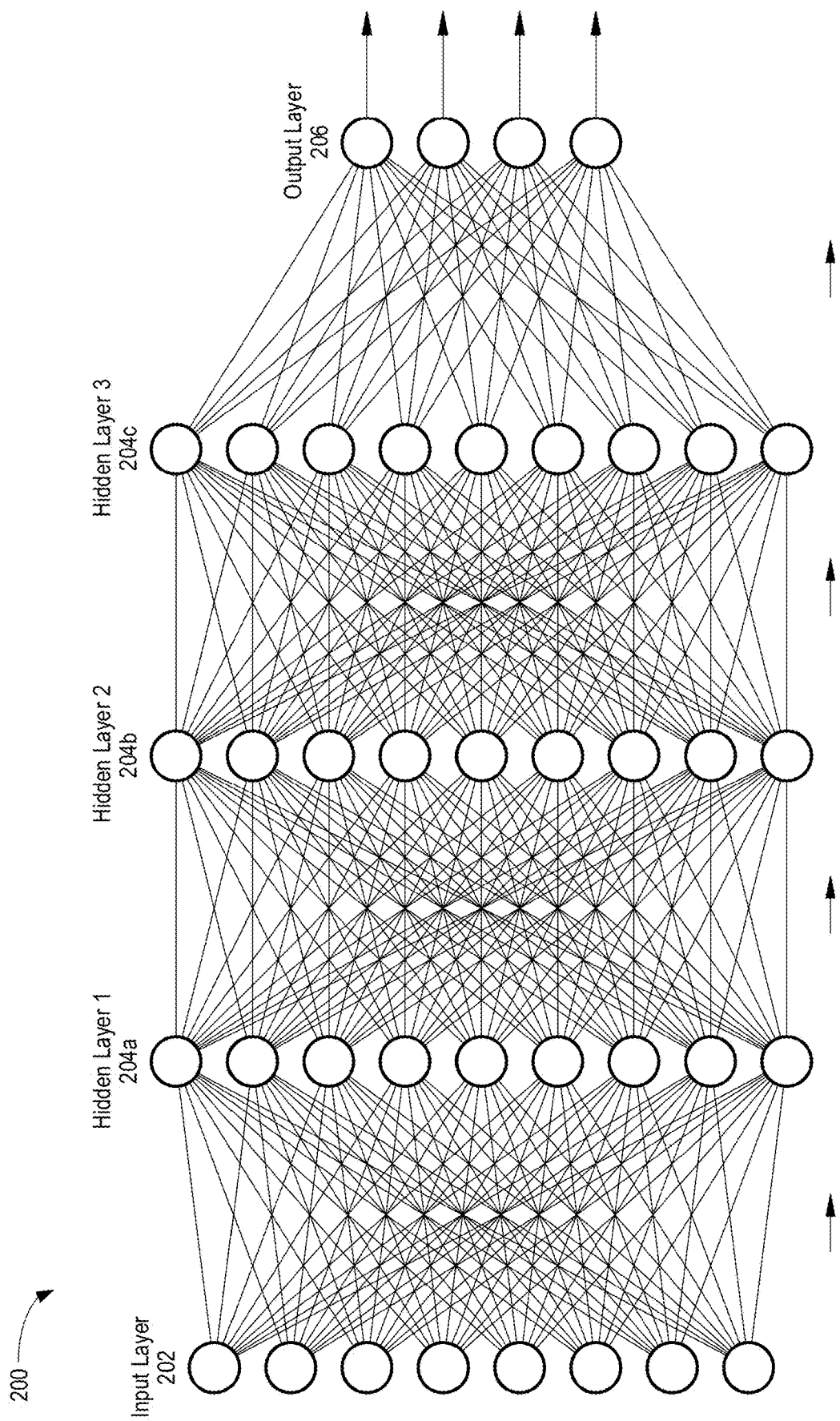
FIG. 2 is an exemplary illustration of a deep neural network, according to certain embodiments.

FIG. 2 is an exemplary illustration of a deep neural network (DNN) 200, according to certain embodiments. The DNN 200 includes an input layer 202, a first hidden layer 204a, a second hidden layer 204b, a third hidden layer 204c, and an output layer 206. The number of hidden layers shown is not intended to be limiting, but to provide an example of a possible embodiment. Furthermore, each of the input layer 202, the first hidden layer 204a, the second hidden layer 204b, the third hidden layer 204c, and the output layer 206 includes a plurality of nodes. Each node of the input layer 202 may be an input node for data input. Each node of the first hidden layer 204a, the second hidden layer 204b, and the third hidden layer 204c combines input from the data with a set of coefficients or weights that either amplify or dampen that input, thereby assigning significance to inputs with regard to the task the algorithm is trying to learn. The results of the third hidden layer 204c is passed to a node of the output layer 206.

A basic forward computation operation (e.g., feed forward) of a single node activation in the DNN 200 may be represented by the following equation: $a_j^l = \sigma(\Sigma_k w_{jk}^l a_k^{l-1} + b_j^l)$. Multi-accumulate (MAC) operations are summed and an activation function is calculated, which may be a maximum (e.g., rectifier activation function or ReLU) or a sigmoid function. In other words, the forward computation operation is an activation sigmoid function applied to a sum over weights multiplied by input values to each neuron or node in the net plus a bias. The DNN 200 learning scheme is based on backpropagation equations used for updating neural network (NN) weights. The backpropagation equations are based on weighted sums using calculated delta terms given below in a matrix and vector form for the nodes of the output layer 206 and the nodes of the first hidden layer 204a, the second hidden layer 204b, and the third hidden layer 204c.

$$\delta^L = \nabla_a C \odot \sigma'(z^L) \quad \text{(BP1)}$$

$$\delta^l = ((w^{l+1})^T \delta^{l+1}) \odot \sigma'(z^l) \quad \text{(BP2)}$$

$$\frac{\partial C}{\partial b_j^l} = \delta_j^l \quad \text{(BP3)}$$

$$\frac{\partial C}{\partial w_{jk}^l} = a_k^{l-1} \delta_j^l \quad \text{(BP4)}$$

The backpropagation equations (BP1, BP2, BP3, and BP4) show that there are fixed inputs (z) that are not changed and can be handled in static memory (e.g., NVM 110 of FIG. 1) and that there are adjustable values (C, δ, and w) that are adjusted or computed temporarily and may be handled in dynamic memory (e.g., DRAM). Another memory consuming element is the DL models themselves (i.e., the NN parameters, which may be the "weights" or C, δ, and w). As the capabilities of the DNN 200 increases, the size of the DL models increases as well. Although a fully-connected NN architecture is exemplified, it is to be understood that the embodiments described herein may be applicable to other NN architectures.

Figure 3:
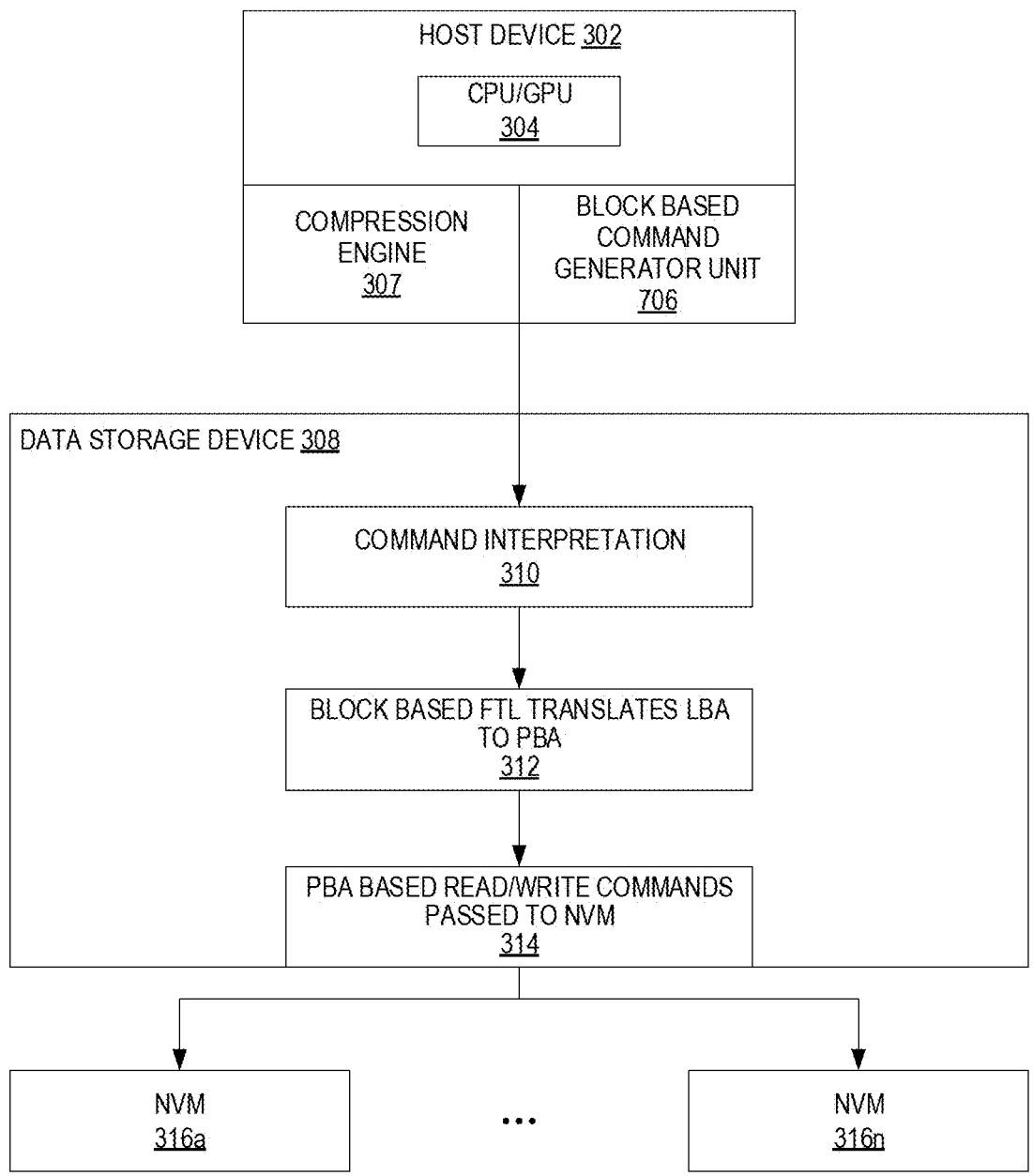
FIG. 3 is a schematic block diagram illustrating a LBA/PBA addressing system, according to certain embodiments.

FIG. 3 is a schematic block diagram illustrating a LBA/PBA addressing system 300, according to certain embodiments. The LBA/PBA addressing system 300 includes a host device 302 coupled to a data storage device 308. The data storage device 308 is coupled to a NVM storage system that includes a plurality of NVMs 316a-316n. It is to be understood that the plurality of NVMs 316a-316n may be disposed in the data storage device 308. In some examples, the plurality of NVMs 316a-316n are NAND devices. The host device 302 includes a CPU/GPU unit 304 and a block based command generator unit 306. The host device includes an optional compression engine 307 in the host device 302 to compress the model such that only the delta from the base model is stored. The model data is passed to the NAND to be stored just as any other regular data, without considering the special characteristics and the fact that the model data already resides in the NAND in some other format. The block based command generator unit 306 generates commands to be programmed to blocks of a NVM of the plurality of NVMs 316a-316n. The host device 302 is aware of the LBA of where the data is stored and the data storage device 308 is aware of the PBA of where the data is stored in the plurality of NVMs 316a-316n.

The data storage device 308 includes a command interpretation unit 310, a block based FTL translation unit 312, and a flash interface unit 314, all of which may be disposed in a controller, such as the controller 108 of FIG. 1. The command interpretation unit 310 may be configured to receive or retrieve commands from the block based command generator unit 306. The command interpretation unit 310 may process the commands and generate the relevant control information for the processed commands. The commands are then passed to the block based FTL translation unit 312, where the commands are translated from LBA to PBA. The flash interface unit 314 passes the read/write commands to the relevant NVM of the plurality of NVMs 316a-316n based on the PBA. In other words, the translation layer between LBA and PBA is stored in the data storage device 308, such that each time a command is passed from the host device 302 to the data storage device 308, the corresponding PBA for the LBA associated with the command is extracted from the translation layer.

Figure 4:
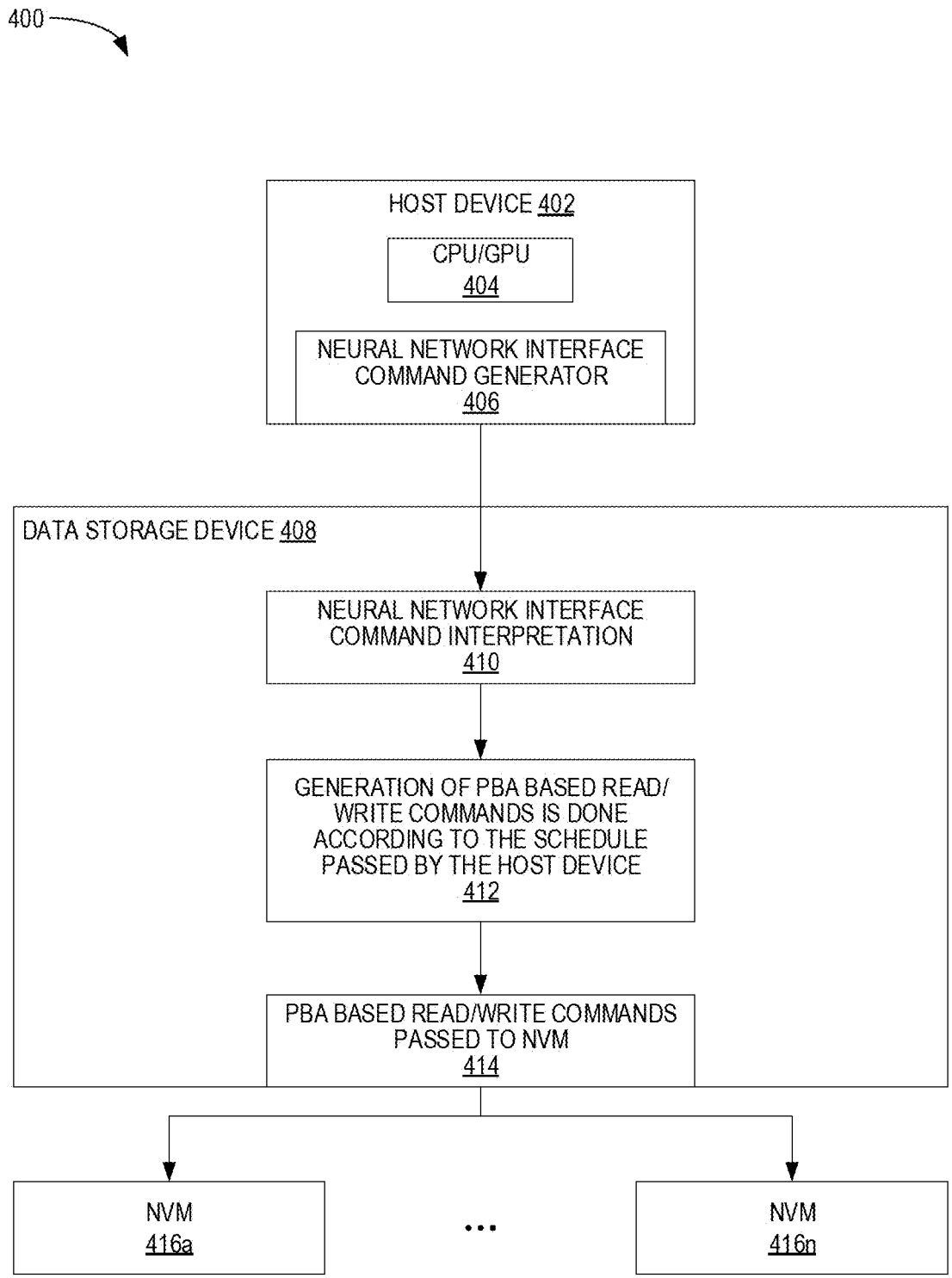
FIG. 4 is a schematic block diagram illustrating a LBA/PBA addressing system, according to certain embodiments.

FIG. 4 is a schematic block diagram illustrating a LBA/PBA addressing system 400, according to certain embodiments. The LBA/PBA addressing system 400 includes a host device 402 coupled to a data storage device 408. The data storage device 408 is coupled to a NVM storage system that includes a plurality of NVMs 416a-416n. It is to be understood that the plurality of NVMs 416a-416n may be disposed in the data storage device 408. The host device 402 includes a CPU/GPU unit 404 and a NN interface command generator unit 406. The NN interface command generator unit 406 generates commands to be programmed to blocks of a NVM of the plurality of NVMs 416a-416n. In some examples, the plurality of NVMs 416a-416n are NAND devices. The commands may include the NN structure and one or more hyper parameter values. The NN structure and the one or more hyper parameter values are stored in one or more NVMs of the plurality of NVMs 416a-416n. The one or more hyper parameter values may define the training procedure of the DL model. The host device 402 is aware of the LBA of where the data is stored and the data storage device 408 is aware of the PBA of where the data is stored in the plurality of NVMs 416a-416n.

The data storage device 408 includes a NN interface command interpretation unit 410, a schedule based FTL translation unit 412, and a flash interface unit 414, all of which may be disposed in a controller, such as the controller 108 of FIG. 1. The NN interface command interpretation unit 410 may be configured to receive or retrieve commands from the NN interface command generator unit 406. The NN interface command interpretation unit 410 may process the commands and generate the relevant control information for the processed commands. In some embodiments, in order to reduce overhead and improved storage utilization for both dynamic parameters (e.g., "weights" and cost calculations) and static parameters, such as the data stored in an NVM of the plurality of NVMs 416a-416n, the data storage device may hold part or all of the NN structure and hyper parameter values.

The commands are then passed to the schedule based FTL translation unit 412, where the commands are translated from LBA to PBA based on a schedule (e.g., a DL model) that is passed to the data storage device 408 from the host device 402. The flash interface unit 414 passes the read/write commands to the relevant NVM of the plurality of NVMs 416a-416n based on the PBA. In other words, the translation layer between LBA and PBA is stored in the data storage device 408, such that each time a command is passed from the host device 402 to the data storage device 408, the corresponding PBA for the LBA associated with the command is extracted from the translation layer.

Figure 5:
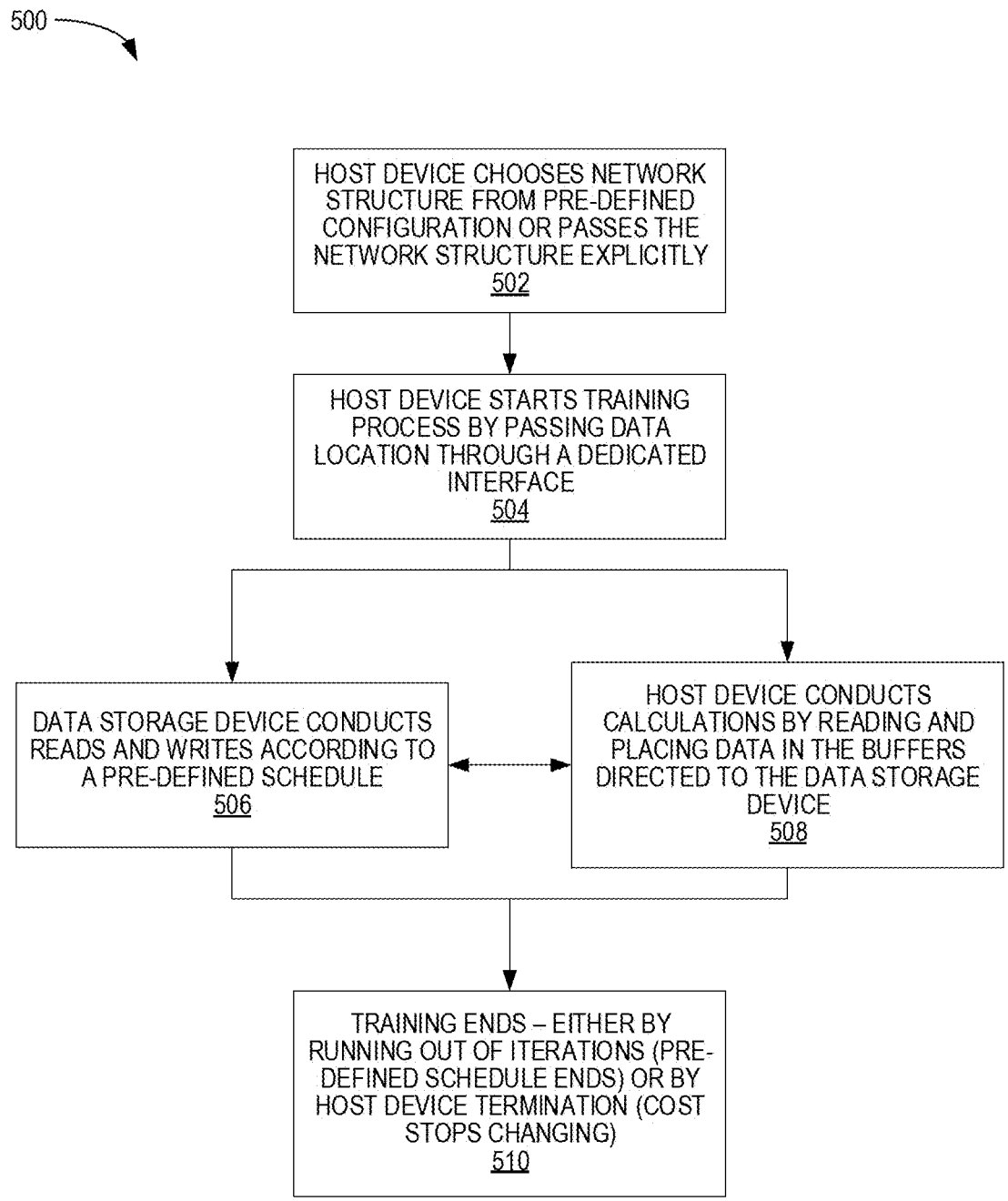
FIG. 5 is a flow diagram illustrating a method of a fully-autonomous data storage device operation during deep learning training, according to certain embodiments.

FIG. 5 is a flow diagram illustrating a method 500 of a fully-autonomous data storage device operation during deep learning training, according to certain embodiments. Method 500 may be implemented by the data storage device 408 of FIG. 4 or the controller 108 of FIG. 1. For exemplary purposes, aspects of the LBA/PBA addressing system 400 may be referenced herein. The fully-autonomous data storage device operation may omit the explicit transfer of NN parameters of specific read and write commands from the CPU/GPU unit 404 to the data storage device 408. In cases when the GPU is utilized in addition to the CPU, dual read/write direct storage access may be allowed between the GPU and the plurality of NVMs 416a-416n.

Rather, the data storage device 408 may hold the NN structure and the hyper parameter values. The NN interface command interpretation unit 410 may receive the NN structure and/or the hyper parameters values prior to the training process or choose the NN structure and/or the hyper parameter values stored in a static configuration (i.e., stored offline). Thus, the training process and the placement of data in buffers (i.e., placement of data into an NVM of the plurality of NVMs 416a-416n based on a L2P mapping) may be completed in a "fully-autonomous" manner, such as without the need for feedback from the host device 402.

At block 502, the host device 402 chooses a NN structure from a pre-defined configuration or passes the NN structure explicitly. The pre-defined configuration may be NN structures previously trained or default NN structures. At block 504, the host device 402 starts a training process by passing a data location through a dedicated interface. For example, the training process may be started by placing values or the data location in the nodes of the input layer 202 of FIG. 2. At block 506, the data storage device 408, or, more specifically, the controller 108, conducts reads and writes according to a pre-defined schedule. The pre-defined schedule may be the NN structure and/or hyper parameter values passed from the host device 402 to the data storage device 408 prior to the training process or held in the data storage device 408 in an offline location (e.g., an NVM of the plurality of NVMs 416a-416n). At block 508, the host device 402 conducts calculations by reading and placing data in the buffers directed to the data storage device 408.

Method 500 may implement either block 506 and block 508 independently or both block 506 and block 508 together. For example, the controller 108 may execute block 506 without executing block 508. In some examples, the results of block 506 may be passed to the host device 402 to implement in block 508 or and/or the results of block 508 may be passed to the data storage device 408 to implement in block 506. As the need for random reads and writes diminishes, data may be addressed in either a full block size or a partial block size. Thus, the NN parameters may be addressed in the pre-defined schedule via starting points and offsets. At block 510, the DL model training ends if a threshold number of iterations has been reached (i.e., the pre-defined training schedule ends) or by the host device 402 terminating the training process, such as due to the cost calculation remaining constant.

In an alternate addressing scheme, a key value (KV) pair interface may be used rather than a PBA to LBA mapping. Each data instance (e.g., value) may be addressed by using a key. NN parameters may be addressed in structures relating to iterations or parts of iterations. For example, all the NN parameters that belong to a first iteration (e.g., nodes 1-100 from a list of nodes greater than 100) may be addressed through a single key.

In order to reduce model overfitting (e.g., redundant calculations, unnecessary shifts, etc.), DL model training may use dropout. Dropout causes some of the nodes of one or hidden layers to be disabled in each iteration of the algorithm to improve the robustness of the DL model, thus, improving the performance of the algorithm. However, dropout introduces a measure of uncertainty. Because the network connections effectively change in each iteration, the NN parameters may be used differently. If the dropout can be applied before the training process, then the modified NN connections may already be reflected in the NN hyper parameters. For example, the controller 108 or the data storage device 408 may either apply the dropout to specific nodes by either parsing the NN structure iteration by iteration or by indicating which nodes should be skipped in each iteration. In some examples, the data storage device 408 or the controller 108 may randomize the nodes that are dropped out in each iteration according to a pre-defined randomization setting.

Figure 6:
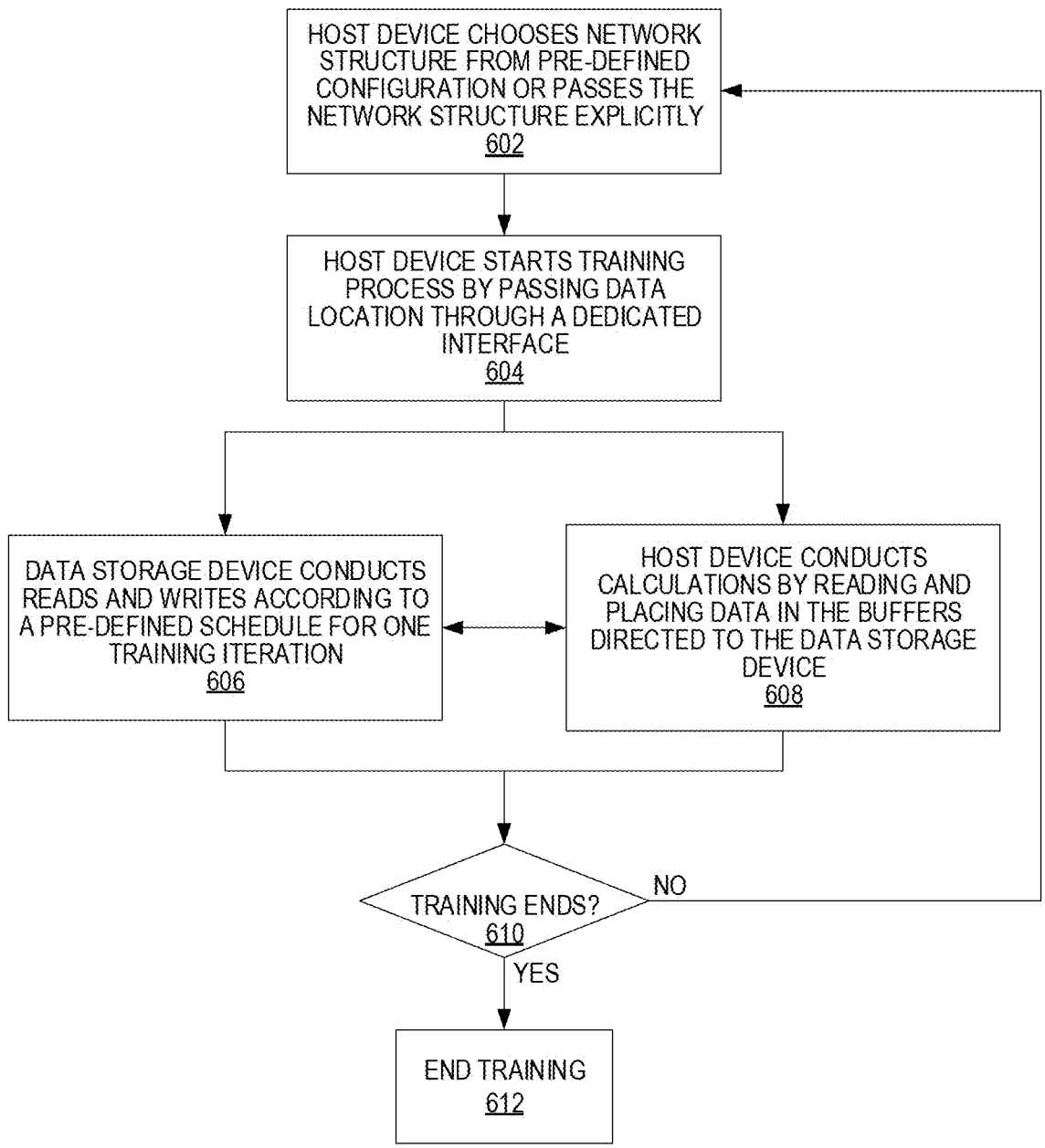
FIG. 6 is a flow diagram illustrating a method of a semi-autonomous data storage device operation during deep learning training, according to certain embodiments.

FIG. 6 is a flow diagram illustrating a method 600 of a semi-autonomous data storage device operation during deep learning training, according to certain embodiments. Method 600 may be implemented by the data storage device 408 of FIG. 4 or the controller 108 of FIG. 1. For exemplary purposes, aspects of the LBA/PBA addressing system 400 may be referenced herein. When the data storage device 408 is operating in the semi-autonomous mode, the CPU/GPU unit 404 may point out the NN parameters to read in each iteration. Thus, a challenge of synchronizing reads/writes may be decreased and treating dropouts may be reduced when storing data in the plurality of NVMs 416a-416n based on a L2P mapping.

The data storage device 408 or the controller 108 may utilize the unique characters of DL model training workload and update the NN parameters after each read and loss calculation in a pre-defined deterministic manner. Thus, the data storage device 408 or the controller 108 may update the "weights" by implementing write commands in a semi-autonomous manner. In other words, each update or write to the NN parameter or "weights" is completed to the same address as the previous read. Therefore, there may be no need to send specific write commands. Rather, the CPU/GPU unit 404 will transfer the list of NN parameter "weights" to update to the data storage device 408 after each iteration.

At block 602, the host device 402 chooses a NN structure from a pre-defined configuration or passes the NN structure explicitly for one iteration. The pre-defined configuration may be NN structures previously trained or default NN structures. At block 604, the host device 402 starts a training process by passing a data location through a dedicated interface. For example, the training process may be started by placing values or the data location in the nodes of the input layer 202 of FIG. 2. At block 606, the data storage device 408, or, more specifically, the controller 108, conducts reads and writes according to a pre-defined schedule for one training iteration. The pre-defined schedule may be the NN structure and/or hyper parameter values passed from the host device 402 to the data storage device 408 prior to the training process or held in the data storage device 408 in an offline location (e.g., an NVM of the plurality of NVMs 416a-416n). At block 608, the host device 402 conducts calculations by reading and placing data in the buffers directed to the data storage device 408.

Method 600 may implement either block 606 and block 608 independently or both block 606 and block 608 together. For example, the controller 108 may execute block 606 without executing block 608. In some examples, the results of block 606 may be passed to the host device 402 to implement in block 608 or and/or the results of block 608 may be passed to the data storage device 408 to implement in block 606. As the need for random reads and writes diminishes, data may be addressed in either a full block size or a partial block size. Thus, the NN parameters may be addressed in the pre-defined schedule via starting points and offsets. At block 610, the data storage device 408 or the controller 108 determines if the DL model training has ended. For example, if a threshold number of iterations has been reached (i.e., the pre-defined training schedule ends) or the host device 402 terminates the training process, such as due to the cost calculation remaining constant, the training has ended. If the training has not ended at block 610, then method 600 returns to block 602. However, if the training has ended at block 610, then method 600 ends at block 612.

By reducing the overhead of command transfer and interpretation between a host device running a machine learning application and flash memory of data storage device, power consumption may be reduced and throughput may be improved.

Figure 7:
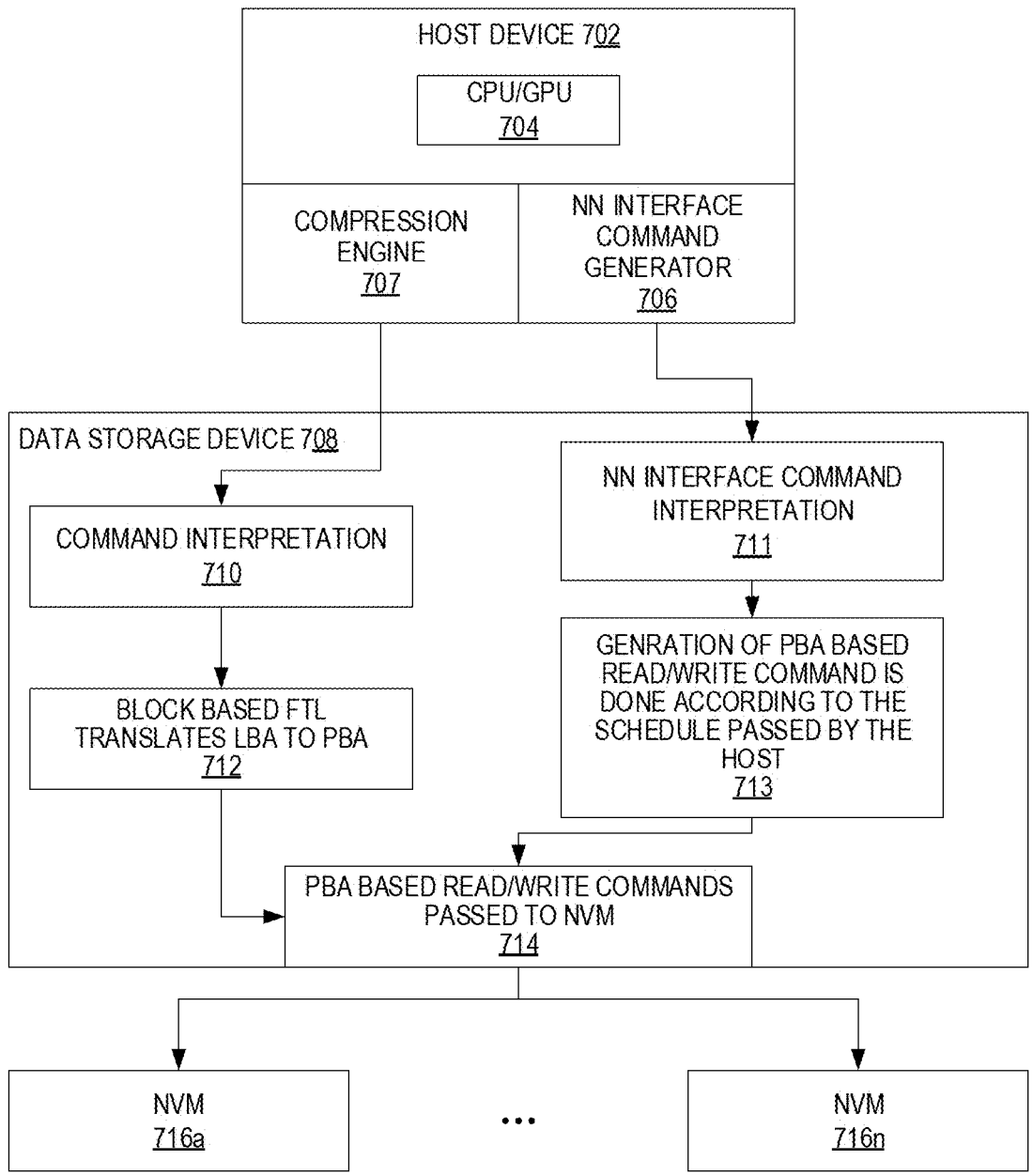
FIG. 7 is a schematic block diagram illustrating a LBA/PBA addressing system, according to certain embodiments.

FIG. 7 is a schematic block diagram illustrating a LBA/PBA addressing system 700, according to certain embodiments. While the training process is done through a dedicated interface that reduces the command overhead (right side of data storage device 708), the model checkpoint compression and storage are done through the current interface (left side of the data storage device 708).

The LBA/PBA addressing system 700 includes a host device 702 coupled to a data storage device 708. The data storage device 708 is coupled to a NVM storage system that includes a plurality of NVMs 716a-716n. It is to be understood that the plurality of NVMs 716a-716n may be disposed in the data storage device 708. In some examples, the plurality of NVMs 716a-716n are NAND devices. The host device 702 includes a CPU/GPU unit 704 and a block based command generator unit 706. The host device 702 includes an optional compression engine 707 in the host device 702 to compress the model such that only the delta from the base model is stored. The model data is passed to the NAND to be stored just as any other regular data, without considering the special characteristics and the fact that the model data already resides in the NAND in some other format. The block based command generator unit 706 generates commands to be programmed to blocks of a NVM of the plurality of NVMs 716a-716n. The host device 702 is aware of the LBA of where the data is stored and the data storage device 708 is aware of the PBA of where the data is stored in the plurality of NVMs 716a-716n.

The data storage device 708 includes a command interpretation unit 710, a NN interface command interpretation 711, a block based FTL translation unit 712, a generation of PBA based read/write command layer 713 and a flash interface unit 714, all of which may be disposed in a controller, such as the controller 108 of FIG. 1. The command interpretation unit 710 may be configured to receive or retrieve commands from the block based command generator unit 706. The command interpretation unit 710 may process the commands and generate the relevant control information for the processed commands. The commands are then passed to the block based FTL translation unit 712, where the commands are translated from LBA to PBA. The generation of PBA based read/write command layer 713 is executed according to a schedule passed by the host device 702. The flash interface unit 714 passes the read/write commands to the relevant NVM of the plurality of NVMs 716a-716n based on the PBA. In other words, the translation layer between LBA and PBA is stored in the data storage device 708, such that each time a command is passed from the host device 702 to the data storage device 708, the corresponding PBA for the LBA associated with the command is extracted from the translation layer.

Figure 8:
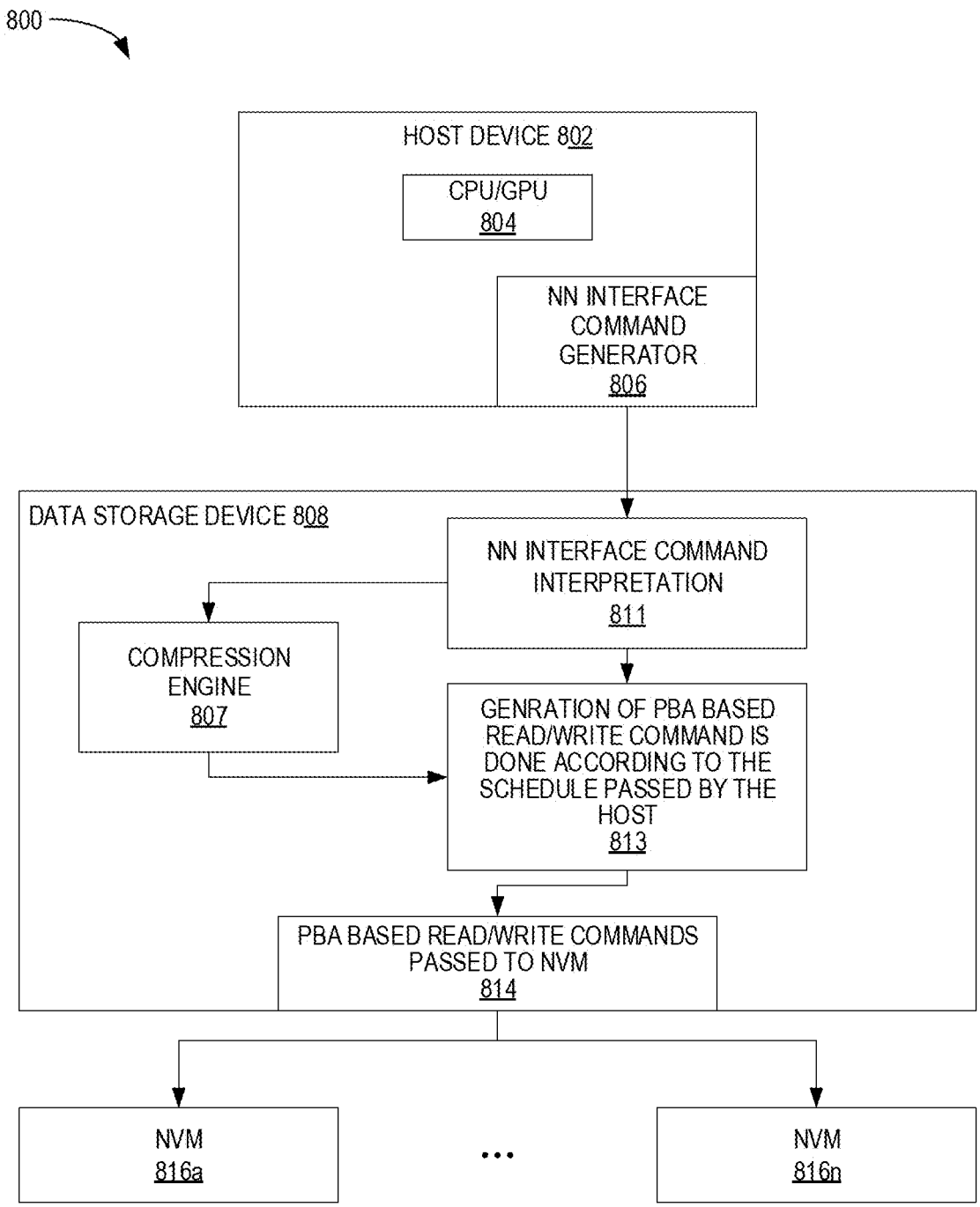
FIG. 8 is a schematic block diagram illustrating a LBA/PBA addressing system, according to certain embodiments.

FIG. 8 is a schematic block diagram illustrating a LBA/PBA addressing system 800, according to certain embodiments. It is to be understood that the interface is modified to include the proposed model checkpoint configuration. According to the interpretation, compression may be conducted to reduce the size of the stored model based on the difference from past iterations. The checkpoint information will then be written to NAND considering the overall schedule, with minimum interference to the performance of the training system.

The LBA/PBA addressing system 800 includes a host device 802 coupled to a data storage device 808. The data storage device 808 is coupled to a NVM storage system that includes a plurality of NVMs 816a-816n. It is to be understood that the plurality of NVMs 816a-816n may be disposed in the data storage device 808. In some examples, the plurality of NVMs 816a-816n are NAND devices. The host device 802 includes a CPU/GPU unit 804 and a NN interface command generator unit 806. The NN interface command generator unit 806 generates commands to be programmed to blocks of a NVM of the plurality of NVMs 816a-816n. The host device 802 is aware of the LBA of where the data is stored and the data storage device 808 is aware of the PBA of where the data is stored in the plurality of NVMs 816a-816n.

The data storage device 808 includes a compression engine 807, a NN interface command interpretation 811, a generation of PBA based read/write command layer unit 813 and a flash interface unit 814, all of which may be disposed in a controller, such as the controller 108 of FIG. 1. The compression engine 807 in the data device 808 is configured to compress the model such that only the delta from the base model is stored. The model data is passed to the NAND to be stored just as any other regular data, without considering the special characteristics and the fact that the model data already resides in the NAND in some other format. The generation of PBA based read/write command layer is executed according to a schedule passed by the host device 802. The flash interface unit 814 passes the read/write commands to the relevant NVM of the plurality of NVMs 816a-816n based on the PBA. In other words, the translation layer between LBA and PBA is stored in the data storage device 808, such that each time a command is passed from the host device 802 to the data storage device 808, the corresponding PBA for the LBA associated with the command is extracted from the translation layer.

Figure 9:
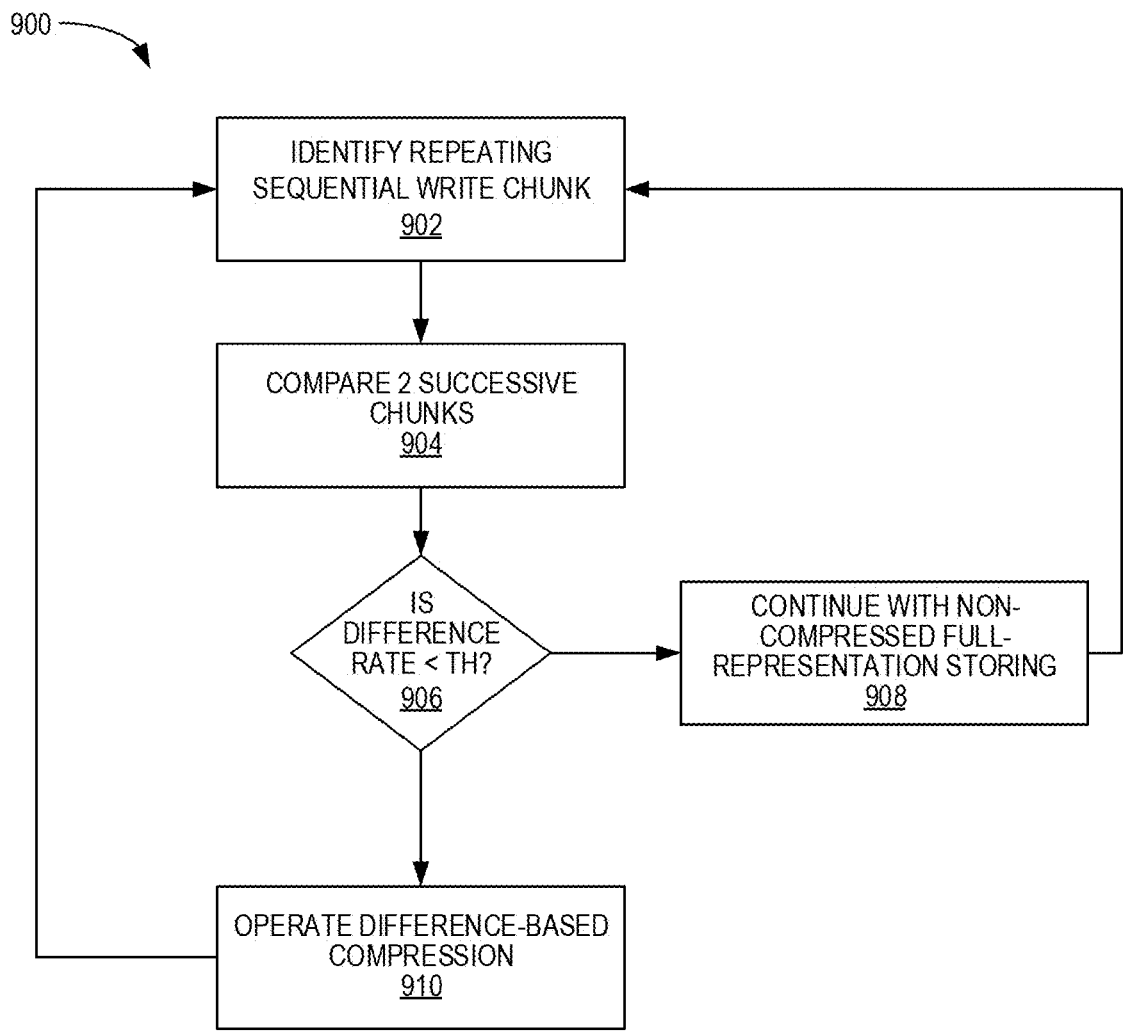
FIG. 9 is a flow diagram illustrating a method of a semi-autonomous data storage device operation during deep learning training, according to certain embodiments.

FIG. 9 is a flow diagram illustrating a method 900 of a semi-autonomous data storage device operation during deep learning training, according to certain embodiments. Method 900 may be implemented by the data storage device 808 of FIG. 8 or the controller 108 of FIG. 1. For exemplary purposes, aspects of the LBA/PBA addressing system 800 may be referenced herein. The fully-autonomous data storage device operation may omit the explicit transfer of NN parameters of specific read and write commands from the CPU/GPU unit 804 to the data storage device 808. In cases when the GPU is utilized in addition to the CPU, dual read/write direct storage access may be allowed between the GPU and the plurality of NVMs 816a-816n.

Rather, the data storage device 808 may hold the NN structure and the hyper parameter values. The NN interface command interpretation unit 811 may receive the NN structure and/or the hyper parameters values prior to the training process or choose the NN structure and/or the hyper parameter values stored in a static configuration (i.e., stored offline). Thus, the training process and the placement of data in buffers (i.e., placement of data into an NVM of the plurality of NVMs 816a-816n based on a L2P mapping) may be completed in a "fully-autonomous" manner, such as without the need for feedback from the host device 802.

The storage system could be informed by the host directly in cases of relevant workloads such as the recommendation system models training applications and select the compression configuration or else avoid the selection entirely. The compression may be based on some initial version of the model stored in the NAND. The difference-based compression will compute the deltas for each of the model's variables from the initial model version. In method 900, the initial model should be stored in some fast access memory (NAND or RAM) as it will be read often. The deltas themselves may be stored in some slow access memory, as they will be read with lower probability when recovery is required.

At block 902, the host device identifies repeating sequential write chunks. The data storage device 808 at block 904, then compares two successive chunks. At block 906, the method 900 determines whether the difference rate is less than a given threshold (TH). If the answer is no to block 906 then method 900 proceeds to block 908. At block 908, method 900 continues with non-compressed full representation storing. If the answer is yes to block 906 then method 900 proceeds to block 910. At block 910, method 900 proceeds to operate difference based compression.

Figure 10:
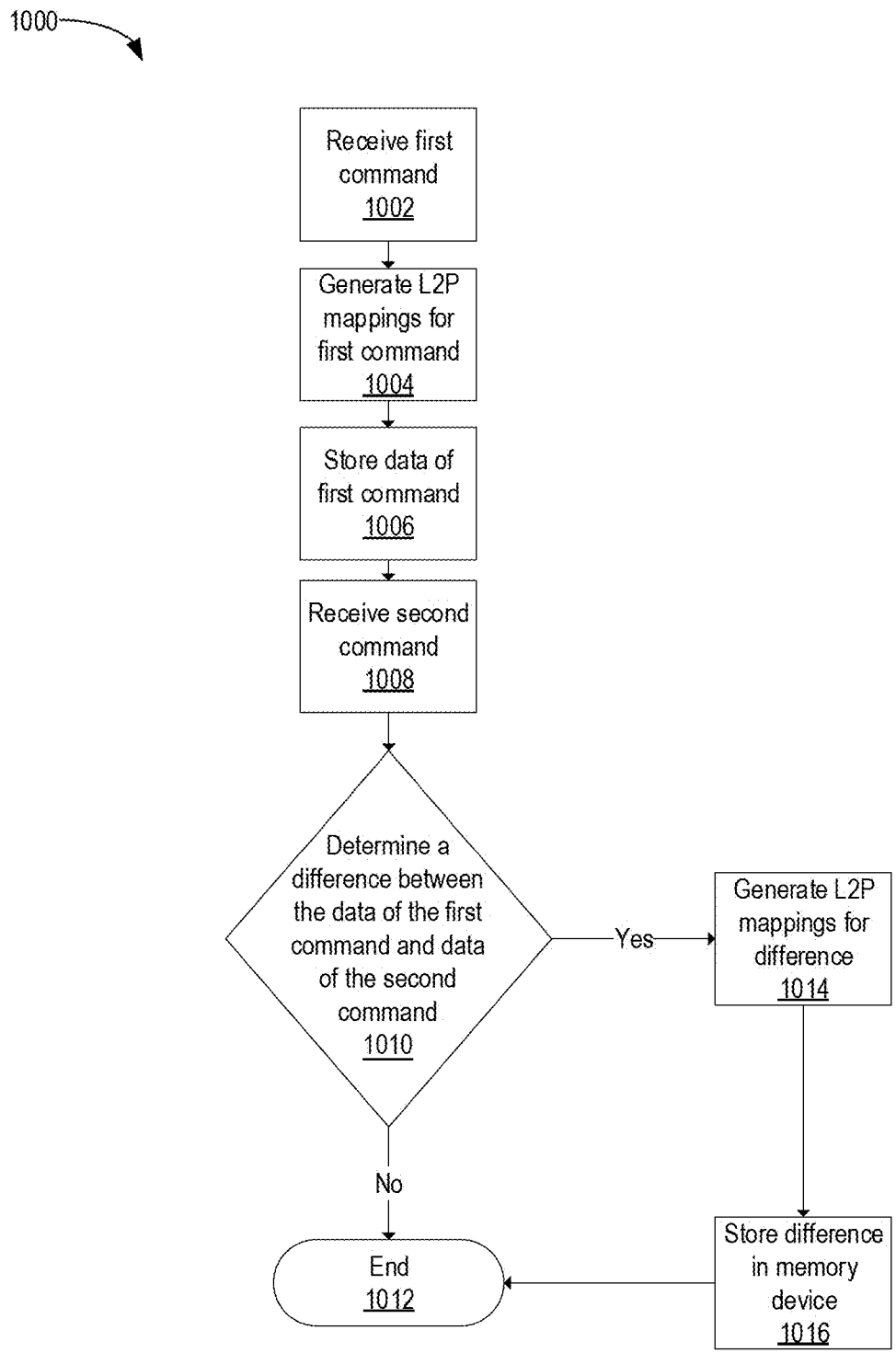
FIG. 10 is a flow diagram illustrating a method of a semi-autonomous data storage device operation during deep learning training, according to certain embodiments.

FIG. 10 is a flow diagram illustrating a method 1000 of a semi-autonomous data storage device operation during deep learning training, according to certain embodiments. Method 1000 may be implemented by the data storage device 808 of FIG. 8 or the controller 108 of FIG. 1. For exemplary purposes, aspects of the LBA/PBA addressing system 800 may be referenced herein. The semi-autonomous data storage device operation may omit the explicit transfer of NN parameters of specific read and write commands from the CPU/GPU unit 804 to the data storage device 808. In cases when the GPU is utilized in addition to the CPU, dual read/write direct storage access may be allowed between the GPU and the plurality of NVMs 816a-816n.

Rather, the data storage device 808 may hold the NN structure and the hyper parameter values. The NN interface command interpretation unit 811 may receive the NN structure and/or the hyper parameters values prior to the training process or choose the NN structure and/or the hyper parameter values stored in a static configuration (i.e., stored offline). Thus, the training process and the placement of data in buffers (i.e., placement of data into an NVM of the plurality of NVMs 816a-816n based on a L2P mapping) may be completed in a "fully-autonomous" manner, such as without the need for feedback from the host device 802.

The storage system could be informed by the host directly in cases of relevant workloads such as the recommendation system models training applications and select the compression configuration or else avoid the selection entirely. The compression may be based on some initial version of the model stored in the NAND. The difference-based compression will compute the deltas for each of the model's variables from the initial model version. In method 1000, the initial model should be stored in some fast access memory (NAND or RAM) as it will be read often. The deltas themselves may be stored in some slow access memory, as they will be read with lower probability when recovery is required.

At block 1002, the controller 108 receives the first command. The data storage device 808 at block 1004, then generates L2P mappings for the first command. At block 1006, the method 1000 stores the data of the first command. At block 1008, the controller receives the second command. At block 1010, the method 1000 determines the difference between data of the first command and data of the second command. If the answer is no, then the method 1000 ends. If the answer is yes then the method 1000 proceeds to block 1014. At block 1014, the method 1000 generates the L2P mapping. The difference in block 1014 refers to the difference between the first command and the second command. At block 1016, the method 1000 stores the difference in the memory. The method 1000, will then proceed to block 1012 to end.

Advantages of this current approach to accelerated DL systems is that improved DL training models reduce overhead of command transfer and interpretation between a host running a machine learning (ML) application and Flash memory. The improved DL training model reduces the power consumption, improves throughput and enables the device to be more competitive in a growing field.

In one embodiment, a data storage device, comprises: a memory device; and a controller coupled to the memory device, wherein the controller is configured to be coupled to a host device, and wherein the controller is further configured to: receive a first command; generate logical block address (LBA) to physical block address (PBA) (L2P) mappings for the first command, wherein the L2P mapping is generated based on a result of deep learning (DL) training model using a neural network (NN) structure; store data of the first command in the memory device; receive a second command; determine a difference between the data of the first command and data of the second command; generate LBA to PBA L2P mappings for the difference, wherein the L2P mapping is generated based on a result of DL training module using the NN structure; and store the difference in the memory device. The controller is further configured to identify repeating sequential write chunks. The controller is further configured to compare two successive write chunks of the repeating sequential write chunks. The controller is further configured to determine whether the difference between the compared two successive write chunks is less than a threshold. The controller is configured to operate difference based compression upon determining the difference is below the threshold. The controller is configured to operate with non-compressed full-representation storing upon determining the difference is above the threshold. The controller is configured to receive an indication from the host device that compression configuration is applicable. The controller is configured to perform compression by computing delta for each iteration of the DL training model and storing the computed delta in the memory device. The delta is relative to an initial DL training model stored in the memory device. The controller is further configured to store deltas for each iteration of the DL training model in the memory device and store an original iteration of the DL training model in NAND or RAM. The memory device is a non-volatile memory device.

In another embodiment, a data storage device, comprises: a memory device; and a controller coupled to the memory device, wherein the controller comprises: a neural network (NN) command interpretation unit; a logical block address (LBA) to physical block address (PBA) (L2P) mapping generator coupled to the NN command interpretation unit, wherein the controller is configured to fetch training data and NN parameters from the memory device; and a compression engine coupled to both the NN command interpretation unit and the L2P mapping generator. The NN command interpretation unit is configured to interface with a NN interface command generator disposed in a host device. The NN parameters are KV pair data. The NN parameters are used in a deep learning (DL) training model. One or more parts of the DL training model are disabled. The controller is configured to update one or more weights associated with a deep learning (DL) training model, and wherein the updating is to a same address as a previous read of the one or more weights.

In another embodiment, a data storage device, comprising: non-volatile memory means; and a controller coupled to the non-volatile memory means, wherein the controller is configured to: store neural network (NN) parameters in the non-volatile memory means; performing a deep learning (DL) training model; store data according to the DL training model; and perform compression based upon a difference between past iterations of performing the DL training model. The controller is further configured to place data of commands in a specified buffer without involvement of a host device. The performing a DL training model comprises conducting reads and writes according to a pre-defined training schedule.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to be coupled to a host device, and wherein the controller is further configured to:
receive a first command;
generate logical block address (LBA) to physical block address (PBA) (L2P) mappings for the first command, wherein the L2P mapping is generated based on a result of deep learning (DL) training model using a neural network (NN) structure;
store data of the first command in the memory device;
receive a second command;
determine a difference between the data of the first command and data of the second command;
generate LBA to PBA L2P mappings for the difference, wherein the L2P mapping is generated based on a result of DL training module using the NN structure; and
compress the data of the first command using a compression engine to store the difference in the memory device.

2. The data storage device of claim 1, wherein the controller is further configured to identify repeating sequential write chunks.

3. The data storage device of claim 2, wherein the controller is further configured to compare two successive write chunks of the repeating sequential write chunks.

4. The data storage device of claim 3, wherein the controller is further configured to determine whether the difference between the compared two successive write chunks is less than a threshold.

5. The data storage device of claim 4, wherein the controller is configured to operate difference based compression upon determining the difference is below the threshold.

6. The data storage device of claim 4, wherein the controller is configured to operate with non-compressed full-representation storing upon determining the difference is above the threshold.

7. The data storage device of claim 1, wherein the controller is configured to receive an indication from the host device that compression configuration is applicable.

8. The data storage device of claim 1, wherein the controller is further configured to compress the data by computing a delta for each iteration of the DL training model and storing the computed delta in the memory device.

9. The data storage device of claim 8, wherein the delta is relative to an initial DL training model stored in the memory device.

10. The data storage device of claim 1, wherein the controller is further configured to store deltas for each iteration of the DL training model in the memory device and store an original iteration of the DL training model in NAND or RAM.

11. The data storage device of claim 1, wherein the memory device is a non-volatile memory device.

12. A data storage device, comprising:
a memory device; and
a controller coupled to the memory device, wherein the controller comprises:
 a neural network (NN) command interpretation unit;
 a logical block address (LBA) to physical block address (PBA) (L2P) mapping generator coupled to the NN command interpretation unit, wherein the controller is configured to fetch training data and NN parameters from the memory device; and
 a compression engine coupled to both the NN command interpretation unit and the L2P mapping generator, wherein the compression engine is configured to compress the fetched training data and NN parameters by storing a delta based on the fetched training data and NN parameters.

13. The data storage device of claim 12, wherein the NN command interpretation unit is configured to interface with a NN interface command generator disposed in a host device.

14. The data storage device of claim 12, wherein the NN parameters are key value pair data.

15. The data storage device of claim 12, wherein the NN parameters are used in a deep learning (DL) training model.

16. The data storage device of claim 15, wherein one or more parts of the DL training model are disabled.

17. The data storage device of claim 12, wherein the controller is configured to update one or more weights associated with a deep learning (DL) training model, and wherein the updating is to a same address as a previous read of the one or more weights.

18. A data storage device, comprising:
non-volatile memory means; and
a controller coupled to the non-volatile memory means, wherein the controller is configured to:
 store neural network (NN) parameters in the non-volatile memory means;
 performing a deep learning (DL) training model;
 store data according to the DL training model; and
 compress the stored data based upon a difference between past iterations of performing the DL training model using a compression engine to store the difference between past iterations.

19. The data storage device of claim 18, wherein the controller is further configured to place data of commands in a specified buffer without involvement of a host device.

20. The data storage device of claim 18, wherein the performing a DL training model comprises conducting reads and writes according to a pre-defined training schedule.

* * * * *